United States Patent [19]

Metzger et al.

[11] 4,054,970
[45] Oct. 25, 1977

[54] APPARATUS FOR DEHEADING SHRIMP

[76] Inventors: Shirley Jean Metzger, 2025 S. Parkwood, Harlingen, Tex. 78550; James Walker Smith, 402 Del Mar, Corpus Christi, Tex. 78404; Juan Castillo Leal, 801 S. "K" St., Harlingen, Tex. 78550

[21] Appl. No.: 693,440

[22] Filed: June 7, 1976

[51] Int. Cl.² .......................................... A22C 29/02
[52] U.S. Cl. ...................................... 17/71; 17/63
[58] Field of Search ............... 17/71, 72, 53, 52, 63

[56] References Cited

U.S. PATENT DOCUMENTS

| | | | |
|---|---|---|---|
| 2,491,778 | 12/1949 | Smith | 17/71 |
| 2,663,897 | 12/1953 | Greiner et al. | 17/63 X |
| 2,794,209 | 6/1957 | Self | 17/71 |
| 2,888,709 | 6/1959 | Lapeyre | 17/71 |
| 2,958,896 | 11/1960 | Merrick | 17/71 |
| 3,020,583 | 2/1962 | Lapeyre et al. | 17/71 |
| 3,281,889 | 11/1966 | Pollitzer et al. | 17/63 X |
| 3,408,686 | 11/1968 | Stephenson | 17/71 |
| 3,538,541 | 11/1970 | Muller | 17/71 |

Primary Examiner—David H. Brown
Attorney, Agent, or Firm—Arthur M. Dula; Murray Robinson; Ned L. Conley

[57] ABSTRACT

The present invention is a mechanical device used to remove the head and anterior exoskeleton from the posterior exoskeleton and musculature of crustaceans belonging to the genus peneus, commonly called prawns or shrimp.

The apparatus comprises a holding tank for storing crustaceans, means for transporting, gueueing up and selectively aligning individual animals; and gripping means selectively capable of gripping and removing the flexible anterior portion of the animal from its relatively tough meaty posterior.

8 Claims, 11 Drawing Figures

Fig. 5

APPARATUS FOR DEHEADING SHRIMP

BACKGROUND OF THE PRIOR ART

1. Field of the Invention

The present invention relates generally to apparatus used to sort, align and otherwise physically manipulate small objects. The present invention relates to devices that perform an operation on a work piece, said operation being dependent upon the alignment of the work piece. Generally, the present invention relates to devices used to segregate and align objects having a preferred axis of orientation from a reservoir of work pieces having random orientation on the preferred axis.

Specifically, the present invention is related to food handling equipment capable of sorting and aligning small animals to a preferred orientation and then dissecting the animal into a plurality of portions automatically. Still more specifically the present invention relates to an apparatus capable of sorting and aligning crustacea of the order macrura, commonly known as prawns or shrimp along their longitudinal axis so the anterior portion of said animal's exoskeleton may be mechanically detached from its muscular tail.

2. Background of the Prior Art

"Shrimp" is the name applied in general to smaller crustacea of the order macrura and in particular to various edible species found on the coasts of Northern Europe and in the Gulf of Mexico. Although most species are quite small, some even microscopic, a few reach a length of up to eight inches. Fisherman usually refer to the larger individuals as "prawns".

Although there are several hundred species of shrimp, the catch of the species peneus exceeds all others in magnitude and importance. The world's largest shrimp fishery is in the Gulf of Mexico, where several hundred million pounds are taken annually by United States, Mexican and Cuban fishermen.

Most shrimp are caught with boat-drawn beam and otter trawls. The shrimp catch is then stored on board ship and brought back to port. The shrimp are then deheaded by hand and their exoskeletons removed either by hand or machine. Alternatively the shrimp may be manually deheaded on board ship.

Both shrimp heads and the muscular tails are commercially valuable. Tails, either peeled or unpeeled are generally sold for human consumption. Shrimp bran is manufactured from dried heads and hulls and sold for animal feed.

Development of machines for removing hulls from shrimp meat caused a large expansion in the shrimp market in the United States, which is the world's largest producer and consumer of shrimp. Unfortunately, prior to the present invention, no mechanical means existed that could successfully and dependably dissect a shrimp's head from the muscular edible tail. At the present time, shrimp are deheaded manually. An interesting and informative insight into this aspect of commercial shrimp processing may be had by reading "Tales of Shrimp" by Stephen Harrigan that was printed in the July, 1975 issue of *Texas Monthly* magazine.

It will readily be appreciated that manual deheading of shrimp significantly raises the retail cost of shrimp and provides a production bottleneck between the shrimp boat and the eventual consumer.

It is therefore an object of the present invention to provide a mechanical means for automatically removing the head from a shrimp.

Yet another purpose of the present invention is to provide a mechanical means for removing the head from the muscular tail of a shrimp that operates dependably and rapidly.

Still another purpose of the present invention is to provide a means of removing heads from a catch of shrimp that requires a minimum of human attention and automatically selects, moves, orients and deheads the shrimp at a rate many times faster than is possible manually.

Yet still another purpose of the present invention is to provide a mechanical means for deheading shrimp that is capable of being mounted on a shrimp boat so a shrimp catch may be deheaded prior to being frozen and stored as cargo.

Yet still a further purpose of the present invention is to provide a mechanical means for deheading shrimp that is modular in construction so a plurality of deheading units may be driven by a single prime mover.

A final purpose of the present invention is to provide a mechanical apparatus that will rapidly and automatically dehead shrimp at a cost far lower than is possible using manual labor.

BRIEF DESCRIPTION OF THE DRAWINGS

FIG. 10 is an isometric partially cut away detailed view of the mechanical synchronizing and shrimp inverting means used in the preferred embodiment of the present invention. In FIG. 10, the shrimp orienting means is shown in its "closed" position and the synchronizing means is shown rotated to deposit a shrimp head first into the deheading means of the preferred embodiment of the present invention.

FIG. 11 is an isometric view of the mechanical details of the shrimp deheading means taught by the preferred embodiment of the present invention. FIG. 11 shows the delivery chute of the deheading means in both of its operational positions.

SUMMARY OF THE INVENTION

The present invention is an apparatus that automatically:

1. Selects shrimp from a randomly oriented mass of shrimp in a storage reservoir;
2. Orients each said shrimp so it is traveling longitudinally either head first or tail first;
3. Synchronously admits one longitudinally oriented shrimp at a time to a selection means that orients each said shrimp to a head first longitudinal orientation; and
4. By placing tension on the flexible head of each said shrimp detaches said head from its associated muscular tail.

The present invention is built around a large water tank full of shrimp. Water in the tank flows so the shrimp are crowded over one edge of the tank. The water returns through a wire mesh and the shrimp fall against a conveyor belt elevator equipped with edge pockets to transport to a vibrating table. The vibrating table has a v-shaped cross-section channel and vibrates to orient the shrimp longitudinally so they face either head first or tail first down the v-shaped channel. This is easily accomplished because shrimp are roughly cylindrical. The vibrating table moves shrimp to a gate mechanism. The gate mechanism is synchronized to deliver shrimp one at a time to the upper end of a wedge shaped vertical chute. One wall of this vertical chute is fixed. The other wall can pivot about its upper end. The vertical chute presents an infundibuliform cross-section to the falling shrimp.

The head of a shrimp is wider than its tail, but most of the shrimp's weight is in its tail. The head of the shrimp thus becomes lodged at some point in the vertical chute. If the shrimp was falling tail down, then the shrimp will be hanging stuck in the chute with its tail pointed down. If the shrimp was falling head down, then the head will stick at some point in the chute and weight of the tail will cause the body of the shrimp to rotate about its head. In both cases the result is a shrimp hanging tail down in the chute. The pivotal side of the chute is then moved to free the trapped shrimp, which then drops tail first into a slot in a mechanical delay means. This delay means rotates the shrimp and deposits it head first into a delivery chute. At the end of the delivery chute two rubber rollers grip the head of the shrimp. These rollers are formed of a rubber-like material and are adapted to draw the head of the shrimp, which is pliable and elastic, through them. The meaty portion of the tail of the shrimp is far tougher and more resilient than the shrimp's head. Because of this resiliency, the tail does not pass through the rollers. The movement of the rollers develops tension between the head and the meaty portion of the shrimp and finally pulls the head loose from the tail. The head is then expelled through the rollers and the meaty portion, a majority of which is still within the delivery chute, is transferred by a swinging movement of the chute away from the rollers. When the delivery chute swings clear of the rollers, the meaty tail portion of the shrimp drops onto a conveyor belt that transports it away for further processing.

The present invention can be characterized as teaching two fundamental concepts in the art of shrimp manipulation.

1. First, the head of the shrimp is wider than the body of the shrimp. The present invention uses this fact to allow the shrimp to be dependably mechanically oriented so it may be presented head first to a deheading means.
2. Second, the head of a shrimp is much more compressible and elastic than the meaty portion of the shrimp's tail. The present invention uses this fact to provide a means by which the head of a shrimp is gripped between rotating mechanical members and pulled free of the tail.

It must be stressed that any device operating to orient a shrimp by catching its head in an infundibuliform structure and then, once the shrimp is oriented for delivery to the deheading means, passes the shrimp's relatively elastic head between at least one moving mechanical means that will pass the head, but not the shrimp's body; practices the present invention.

It is the nature of discoveries within the mechanical arts that such inventions permit a broad variety of equivalent structures to practice any given function. It is the intention of the present invention to claim all structures capable of practicing the functions described in the paragraphs above. The detailed preferred embodiment described below teaches the best way the inventor knows to make and use a device that performs these functions. It is intended to teach one skilled in the art a means by which he may quickly and without undue experimentation use the present invention. Nothing in this specification, however, should be inferred as limiting the scope of the present invention.

DESCRIPTION OF THE PREFERRED EMBODIMENT

Figure 1:
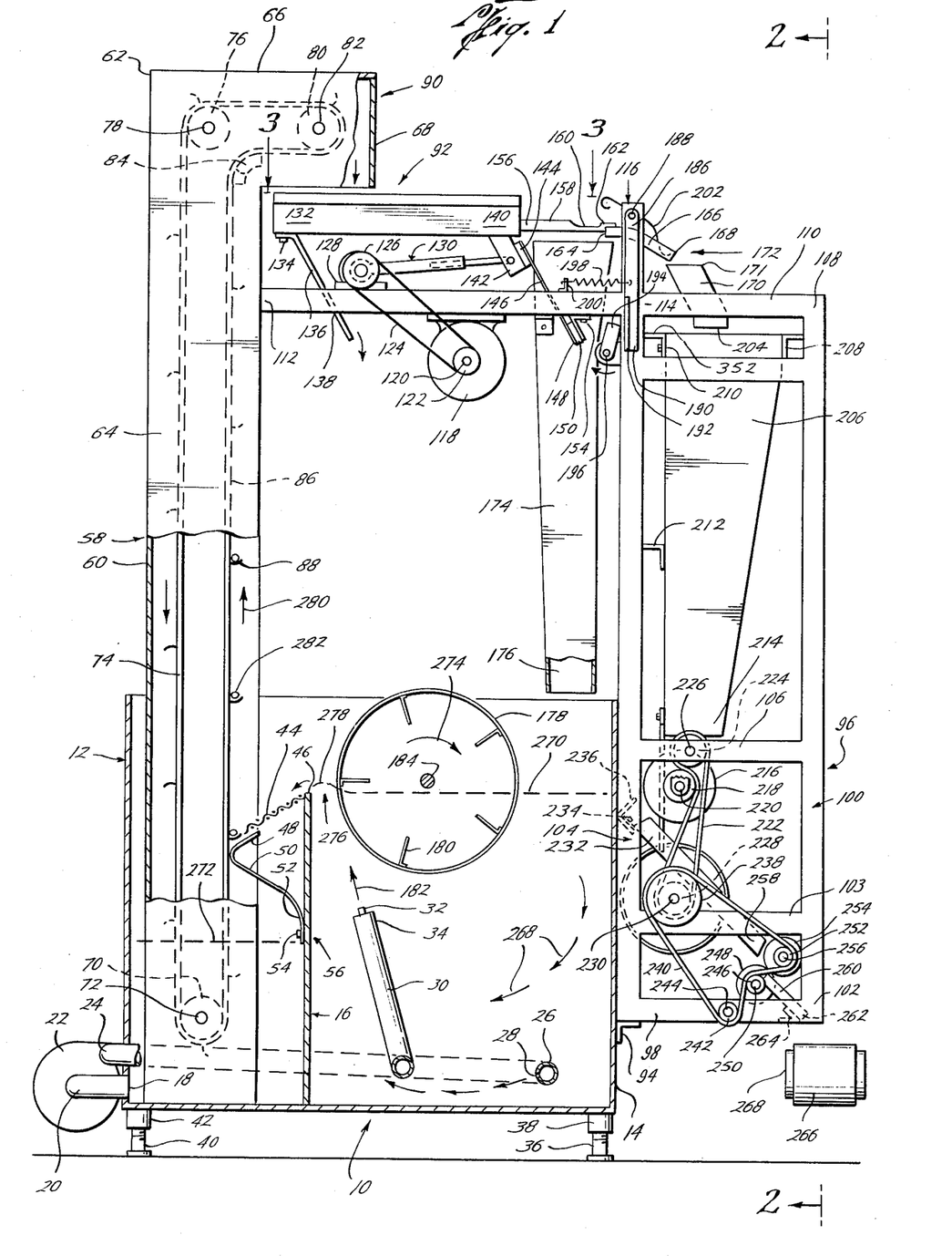
FIG. 1 is a partially cut away schematic side view of an apparatus constructed according to the preferred embodiment of the present invention.

FIG. 1 shows a partially cut away side view of the preferred embodiment of the present invention.

Structurally, tank 10 has left-hand wall 12, right-hand wall 14 and intermediate wall 16, which is shorter than walls 12 and 14. Tank 10 is provided with an opening 18 at the bottom of wall 12 that sealingly engages return pipe 20. Return pipe 20 is the supply line to centrifugal pump 22. The output of centrifugal pump 22 is connected to delivery pipe 24. Delivery pipe 24 is connected to a first transverse pipe member 26 having a number of openings 28. Pipe 24 is also connected in flow communication with second pipe member 30. Nozzle 32 provides an opening at terminal end 34 of pipe 30. Adjustable foot pad 36 screwably engages fixed foot pad receiver 38 at the bottom of forward edge 14 of tank 10. Likewise, threaded adjustable foot pad 40 screwably engages adjustable foot pad receiver 42 at the bottom edge of wall 12 of tank 10.

Screen 44 is attached at its upper end to top 46 of short wall 16 and at its lower end 48 to the upper portion of curved member 50. Bottom end 52 of curved member 50 is attached by screw 54 to a lower point 56 on wall 16. Conveyor mechanism 58 is affixed to the bottom of tank 10 between wall 12 and wall 16. Rear wall 60 of conveyor mechanism 58 extends from the bottom of tank 10 to its top end 62. Metal covering 64 is affixed to wall 60. Wall 60 has a top horizontal portion 66 and a forward short front portion 68 parallel to wall 60.

Lower roller 70 is mounted on axle shaft 72. Conveyor belt 74 passes around lower roller 70, travels up the entire length of conveyor housing 58 to upper roller 76 on axle 78. Belt 74 then travels horizontally to roller 80 on axis 82 and returns over idler 84 down right-hand side 86 of conveyor mechanism 58 to lower roller 70.

The surface of conveyor belt 74 is equipped at regular intervals with curved shrimp receiving troughs 88. These shrimp receiving troughs curve upward from the surface of belt 74 when they are traveling upward on right-hand side 86 of conveyor mechanism 58. Upper horizontal portion 90 of conveyor mechanism 58 is positioned directly over shaker table 92.

Angle bracket 94 is affixed by welding or other means partially up side 14 of tank 10. Support framework 96 consists of a lower horizontal member 98 connected at its left side to angle support 94 and side 14 of tank 10. The lower end of vertical support 100 connects to right-hand front end 102 of horizontal support 98. Horizontal cross-member 103 is connected at its right-hand side to vertical structural member 100 and its left-hand side to vertical structural member 104. Horizontal cross-member 106 is connected at its right-hand side to vertical member 100 and at its left-hand side to vertical structural member 104 at a point near the top of side 14 of tank 10. Top 108 of vertical member 100 is connected to horizontal support member 110. The left-hand end of horizontal support member 110 connects at its end 112 to conveyor support housing 58. Vertical support member 104 extends upward to an intersection 114 with horizontal support member 110 and then extends further up to top 116 of vertical support member 104.

Prime mover 118, which may be an electric motor or other prime mover, is functionally connected by axle 120 to prime mover pulley 122. Belt 124 connects prime mover pulley 122 to eccentric pulley 126. Eccentric 128 is mounted on the top of horizontal structural support 110. Eccentric 128 has eccentric pulley 126 and eccentric arm 130. Shaker table 92 is connected at its rear end 132 by nut 134 to the upper end of first resilient member 136. Lower end 138 of resilient member 136 is connected by bolts, welding or any other convenient means to horizontal support member 110. Front 140 of shaker tray 92 is connected to arm 142. The front of arm 142 is connected through resilient pad 144 to second flexible mounting means 146. Lower end 148 of second flexible mounting means 146 is mounted through resilient pad 150 to bracket 152. Bracket 152 is secured by nut 154 to the under side of horizontal structural member 110. Front 140 of shaker tray 92 engages the rear 156 of shrimp feeding arm 158. Shrimp feeding arm 158 has a cut away portion 160 near its forward end 162. The forward end 162 of shrimp directing means 160 lies over rear portion 164 of shrimp timing chute 166. The timing chute is part of the hold and release mechanism that is described in connection with FIGS. 6 and 7 infra.

Forward end 168 of shrimp timing chute 166 is oriented directly over upper end 171 of transfer chute 170. Directly under cut away portion 160 of shrimp transfer means 158 is upper end 172 of shrimp return chute 174. Lower end 176 of shrimp return chute 174 lies directly over the right-hand side of tank 10 slightly anterior to wall 14.

Rotating mesh drum 178 is located within the anterior portion of tank 10 and is equipped along its inner periphery with a plurality of paddle baffles 180. Paddle baffles 180 are oriented to be responsibly aligned with jet of water 182 exiting nozzle 32 of pipe 30. Mesh drum 178 is rotatably mounted on axle 184.

Timer lever 186 is affixed at its upper end to pivot axis 188 on upper portion 116 of structural member 104. Lower end 190 of timing lever arm 186 is equipped with angled portion 192 at its terminal end. Timing arm 194 is positioned to strikably engage angled portion 192 on arm 190. Timing pivot arm 194 is rotatably mounted on axle 196. Arm 186 is attached to the anterior end of spring 198. The posterior portion of spring 198 is connected in tension by brackets 200 to the upper surface of horizontal support member 110. Shrimp holding and passing arm 202 is connected at its midpoint to axle 188.

Lower end 204 of transfer chute 170 is positioned over the top of variable geometry orienting chute 206. The upper end of the movable side of chute 206 is pivotably mounted between brackets 208 and 210. Bracket 212 is connected to the fixed side of variable geometry orienting chute 206. Lower end 214 of variable geometry orienting chute 206 is positioned directly above shrimp longitudinal position inverter wheel 216 which is rotatably connected to pulley 218 on shaft 220. Chain 222 engages sprocket 218 and passes around upper idler ratchet 224 on shaft 226; down around inverter wheel ratchet 218 to lower internal drive ratchet 228 on shaft 230. Inverter wheel 216 is positioned directly over the upper end of deheader delivery chute 232.

Delivery chute 232 is affixed pivotably at its upper end by pivotable mount 234 to angle bracket 236. Angle bracket 236 is affixed by welding or other convenient means to side 14 of tank 10. Outer drive ratchet 238, which is mounted external to ratchet 228 on axle 230, operationally engages chain drive 240. Chain drive 240 passes around idler ratchet 242, which is rotatably mounted on shaft 244 on lower horizontal support member 98. Chain drive 240 then passes over drive ratchet 246, which is rotatably connected to first deheader rubber roller 248 on shaft 250. Chain drive 240 continues around the opposite side of ratchet 252, which is operationally connected to second deheader roller 254, on shaft 256.

Lower portion 258 of deheader delivery chute 232 is positioned so that its bottom is proximate the point of contact between rubber deheader cog rollers 248 and 254. The upper portion of shrimp meat delivery chute 260 is located to the side of, and in this drawing partially obscures, the point of contact between the shrimp deheader rollers 254 and 248. Lower portion 262 of tail meat chute 260 is connected by angle brace 264 to the lower internal portion of bottom horizontal support 98. Lower portion 262 of chute 260 is located directly above the upper surface of conveyor belt 266, which moves transverse to this picture over roller 268.

The entire structure described above should be built of material that will resist corrosion caused by salt water. This is necessary because the entire apparatus is subjected to water sprays during operation to lubricate the passage of shrimp through its various chutes and wheels. It is presently contemplated that these machines will operate on board shrimp boats, thus the supply of water used in its operation may be saline.

In order to clearly illustrate the mechanical details essential to the operation of the present invention, certain details, such as mounting plates, bearings, etc., are omitted from these drawings. Any mechanical engineer possessing ordinary skill in mechanical arts will know where these details should be placed for efficient operation of the apparatus.

Functionally, the portion of the apparatus shown in FIG. 1 operates as follows.

A large number of shrimp of varying sizes are dumped into tank 10 between walls 16 and 14. Jets of water produced by openings 28 in transverse pipe member 26 and jet 32 on the end 34 of pipe 30 create a flow of water in the tank. This flow is diagrammatically illustrated by arrows 282 and 268. Water level in tank 10 is shown by dotted line 270 to the right of wall 16 and 272, a lower water level, to the left of wall 16. The flow of current in tank 10 is roughly clockwise about that portion of the tank formed by the bottom of the tank and walls 16 and 14. The jet of water proceeding out of jet 32 of pipe 30 strikes baffles 180 in wire mesh drum 178 and causes it to rotate in the direction shown by arrow 274. This causes the shrimp to be separated and moved to area 276 at the drum's posterior. The shrimp are then swept over the top edge of tank 16 by the slight welling up of water 278 onto diagonally downward sloping mesh screen 44. Water flows through mesh screen 44 down to water level 272 to the left-hand side of wall 16. Water in the posterior portion of tank 10 is returned through pipe 20 and pumped by centrifugal pump 22 back into the forward section.

After the shrimp are washed over top 46 of wall 16 they roll down screen 44 to the screen's lower end 48. Each shrimp is then picked up by an upwardly curved carrier 88 on conveyor belt elevator 74. Conveyor belt 74 is moving upward in the direction indicated by arrow 280. In FIG. 1, the shrimp being carried by carrier 88 is indicated schematically by the small circle 282 lying within upwardly curved handling members 88 affixed to belt 74. Once the shrimp passes up conveyor belt 74 to the horizontal portion of the belt within housing 90, then the curved shrimp transporting ledge 88 tilts and drops the shrimp onto the back elevated end 132 of shaker table 92. The detail of this shaker table will be discussed later. For the present it is sufficient to know that the shaker table longitudinally aligns shrimp in a v-shaped trough either head first or tail first.

Longitudinally aligned shrimp then pass out of the shaker table, across arm 158 and queue up behind shrimp hold and release gate mechanism 202. If an excess of shrimp pile up behind this gate mechanism, the excess shrimp crowd off cut away area 160 and drop down through shrimp return chute 172 into the forward portion of tank 10. Prime mover 118 drives eccentric 128 by means of belt 124 connecting pulleys 120 and 126. Eccentric 128 causes shaker table 92 to rapidly move fore and aft. This shaking movement causes shrimp to move from elevated upper portion 132 to forward lower portion 140 of the shaker table.

Arm 186 actuates shrimp hold and release mechanism 202 in response to the rotation of actuating arm 194 about axis 196. The details of this mechanism are explained below. Arm 186 is normally biased so the front of member 202 is depressed, as shown in FIG. 1 by spring 198. Arm 194 revolves to strike arm 186 and causes hold and release mechanism 202 to drop a single shrimp through transfer chute 170 into the top of variable geometry orienting chute 206. The details of chute 206 are explained in the discussion accompanying FIGS. 8 and 9, infra. Generally, the walls of each chute normally present a gradually narrowing cross-section to a shrimp falling between them. Because the head of the shrimp is wider than its meaty tail, the shrimp's head will become stuck at some point between the walls of chute 206. When this happens the weight of the shrimp's tail will cause the shrimp to rotate around the head so the shrimp will be hanging by its head within the chute in a tail down position. As will be explained in greater detail later, the chute is mechanically opened at controlled intervals to permit the caught shrimp to fall tail downward into a slot in receiving delay mechanism 216. Chute 206 then closes to receive and orient another shrimp.

Orienting mechanism 216 then deposits the shrimp head first into delivery chute 232. The shrimp slides down delivery chute 232 head first until its head strikes the point of contact between shrimp deheading rollers 254 and 258. The shrimp's head is more flexible and pliable than the meaty section of its tail and becomes engaged between cog rollers 252 and 248. This causes the shrimp's head to be drawn between the rollers, but the tail resists passage between them. Tension is developed between head and tail, severing the head. The head is then expelled between the rollers. The tail remains at bottom 258 of delivery chute 232. Chute 232 then moves laterally transforming the meaty portion of the shrimp's tail away from the rollers. The meaty tail section of the shrimp falls onto meat transfer chute 260. Transfer chute 260 carries the tail out to its end 262 where it falls onto conveyor belt 266 and is carried away for further processing.

Figures 2, 3, 4:
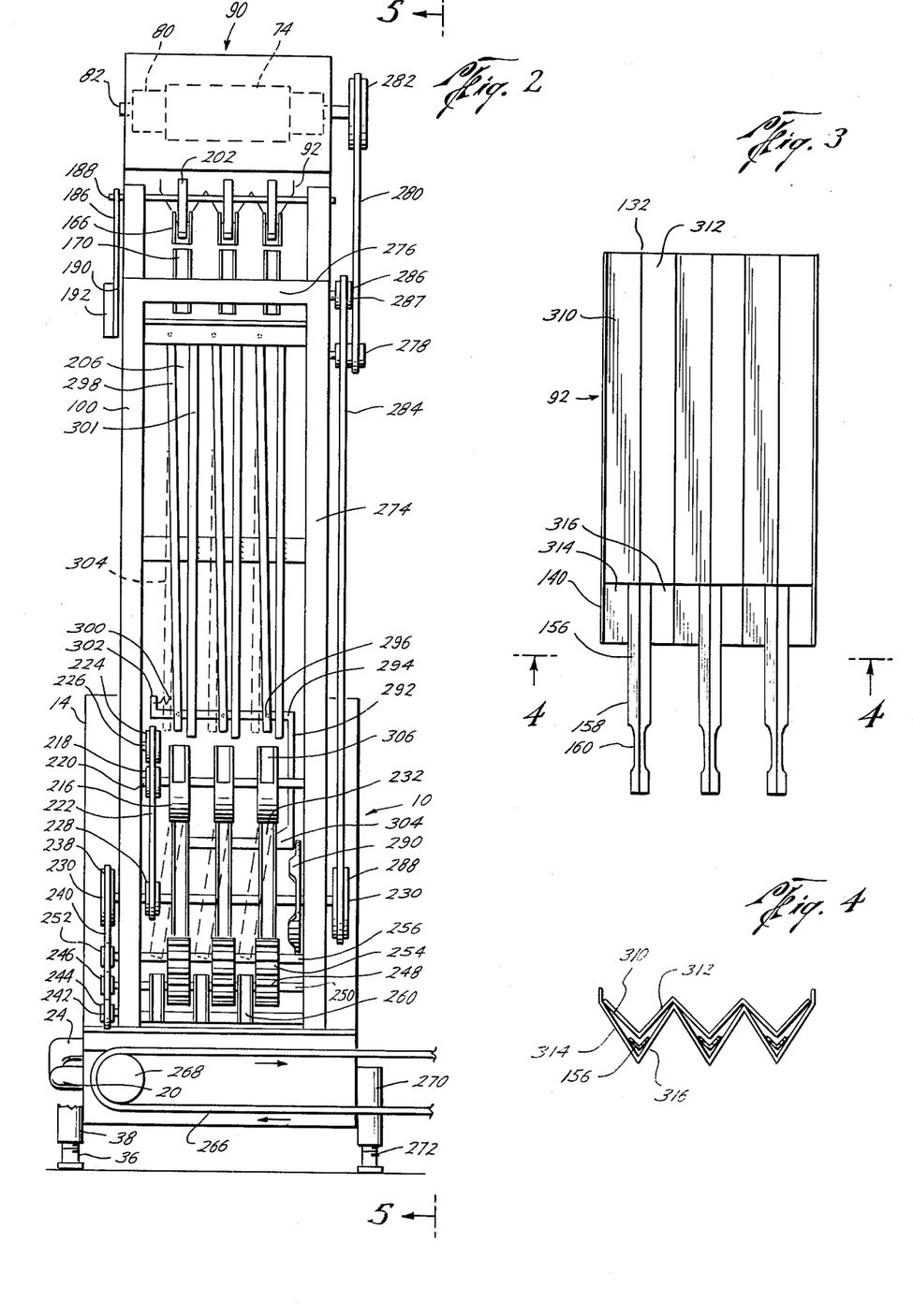
FIG. 2 is a view along lines 2—2 of FIG. 1 and shows a view of the front of an apparatus having three deheading units constructed according to the preferred embodiment of the present invention.
FIG. 3 is a detailed plane view of the shaker tray of the preferred embodiment of the present invention.
FIG. 4 is a view taken along lines 4—4 of FIG. 3 and shows a cross-sectional front view of the shaker tray taught as a part of the preferred embodiment of the present invention.

FIG. 2 shows a front view of the apparatus described in FIG. 1. Like numbers indicate like parts in this drawing.

The embodiment shown as the preferred embodiment of the present invention in FIG. 2 has three identical modular sections. The purpose of FIG. 2 is to illustrate the method and apparatus by which shrimp are transported from the end of the shaker tray down through the variable geometry chute to the shrimp deheader wheels. The preferred embodiment of the present invention may be built using any number of modular sections as shown in FIG. 2. In this example, three chutes are shown with their associated slides, delivery troughs and deheading wheels. To keep description of the invention as simple as possible, only one chute and its associated components will be described, it being understood that any number of like chutes could operate in parallel and still practice the present invention.

Structurally, FIG. 2 shows a front view of tank 10. On the opposite side of wall 14 from mounting foot 38 is mounting foot 270, which threadably receives threaded foot 272. Structural member 274 parallels structural member 100 on the right-hand side of the front 14 of tank 10. Top horizontal cross-member 276 connects vertical members 100 and 274.

Prime mover 118, not shown, is equipped on its right-hand side with dual sprocket 278. Chain drive 280 connects sprocket 278 with drive sprocket 282 mounted on shaft 82. The inner portion of drive sprocket 278 drives chain drive 284. The upper end of chain drive 284 passes over drive sprocket 286 on shaft 287 to drive timer arm 194, not shown. Chain drive 284 passes down along the right side of structural member 274 to operationally engage drive sprocket 288 on axle 230. Cam 290 is affixed to and rotates with axle 230.

Cam 290 operationally engages synchronizing arm 292. Synchronizing arm 292 has an upper portion 294 that is pivotally attached at pivot point 296 to the pivotally mounted side member 298 of variable geometry chute 206. Synchronizing arm 292 is biased to hold chute 206 in the closed position shown in FIG. 2 by spring 300, which connects a stub riser 302 at the terminal end of arm 294 to a bracket, not shown, on the top of wall 14 of tank 10. Synchronizing arm 292 is attached at its lower end to lower cross arm 304, which operationally engages pivotal deheader delivery chute 234 at a point below pivot point 234.

Functionally, shrimp move off vibrator table 92 and are released one at a time into chute 206 by shrimp hold and release mechanism 202. One shrimp at a time falls down transfer chute 170 into variable geometry orienting chute 206. The orienting chute is wide at the top end and narrower at its bottom end when it is in its normal closed position.

Individual shrimp released by hold and release mechanism 202 fall down the center funnel shaped opening of orienting chute 206 until the chute becomes so narrow that the head of the shrimp is caught between movable wall 298 and fixed wall 301. At this point the shrimp rotates about its head until the tail is hanging downward. Rotating cam 290 then engages synchronizing arm 292 causing crossarm 294 to move to the left against the bias of spring 300. This movement causes the pivotal wall 298 of chute 206 to open to a position shown by dotted line 304. When chute 206 opens, the shrimp falls tail downwardly into receptacle 306 in transfer wheel 216. Variable geometry chute 206 then returns to its normal closed position to receive another shrimp.

Transfer wheel 216 rotates on shaft 230 and deposits the shrimp in cavity 360 head first into the upper end of deheader chute 232. The shrimp slides down chute 232 until its head is caught between cogged rollers 254 and 248. These rollers pinch off the shrimp's flexible head, but will not pass its tough resilient meaty tail.

When cam 290 turns 180 degrees, it again actuates synchronizing arm 292. As synchronizing arm 292 moves to the left against the bias of spring 300, its lower crossarm 304 causes delivery chute 232 to pivot to the position shown by dotted lines 308. Since the meaty portion of the shrimp has not been pulled through rollers 254 and 248, it is still largely in chute 232. When chute 232 pivots beyond the edge of deheading rollers 254 and 248, the shrimp's tail falls into delivery chute 260, which deposits it on conveyor belt 266.

The above description follows one shrimp through the preferred embodiment of the present invention. It should be recognized that each and every time cam 290 engages synchronizing arm 292 two things happen:

1. A shrimp drops tail first from orienting chute 206 into receptacle 306 of orienting wheel 216; and
2. Shrimp delivery chute 232 is moved laterally away from deheader wheels 254 and 248 allowing the meaty portion of a shrimp to fall through the transfer chute onto the conveyor belt.

Both events occur during the small amount of time chute 206 is open and chute 232 is laterally moved away from the deheader wheels. During the majority of the present invention's operating cycle, variable geometry sorting chute 206 is in its closed position and shrimp deheader delivery chute 232 is positioned so the head of a shrimp falling out of orienting wheel 216 is presented to the point of intersection between rubber rollers 254 and 248.

It will readily be appreciated by those skilled in the art that timing of the shrimp's fall from the orienting chute; into the transfer orienting wheel; down the deheader delivery chute; and through the deheading rollers, must be carefully synchronized. These time intervals are dependent upon the physical geometry of the preferred embodiment of the present invention. Selection of particular chute lengths and cog wheel ratios are matters of design choice well within the skill of a person having ordinary skill in the art of mechanical engineering.

FIG. 3 shows a plane view of shaker table 92 taught by the preferred embodiment of the present invention. Again, like numbers indicate like structures. It will be noted that the shaker table in FIG. 3 is divided into three identical sections. These sections correspond to the three shrimp orienting chutes and their associated deheading wheels discussed in connection with FIG. 2 above. Only one of the three identical sections will be discussed. It should be understood that any number of similar modules may be incorporated in parallel into the shaker table without departing from the spirit of the present invention.

Rear 132 of shaker table 92 is at a higher elevation that its front 140. Each operational section of shaker table 92 consists of two connected v-shaped troughs having sides 310, 312 and 314, 316. V-shaped member 158 is attached to the shaker table between upper v-shaped trough formed by sides 310 and 312 and lower v-shaped through formed by sides 314 and 316.

Functionally, a shrimp having some random spacial orientation falls off the conveyor elevator onto the rear end 132 of shaker table 92. Shaker table 92 is vibrating and this vibration impells the shrimp to seek the most stable position within the trough. The shrimp will therefor quickly become aligned either head first or tail first in the bottom of the upper v-shaped trough. As this table vibrates, the shrimp moves down the trough toward forward end 140 and subsequently out into v-shaped member 158. Shrimp queue up along member 158 and back onto the v-shaped trough. If more than one shrimp at a time reaches section 160 of the v-shaped trough, the additional shrimp falls off trough 158 into chute 174 to be returned to the shrimp holding tank, as was described in connection with FIG. 1 above.

FIG. 4 shows a cross-sectional view along lines 4—4 of FIG. 3. This figure shows the mechanical relationship between the upper and lower v-shaped troughs of vibrater table 92 and v-shaped member 158. As is here shown, v-shaped member 158's rear end 156 fits between, and is attached to, the v-shaped openings formed by upper sides 310 and 312 of the upper v-shaped trough and lower sides 314 and 316 of the lower v-shaped trough of each section of shaker table 92.

Figure 5:
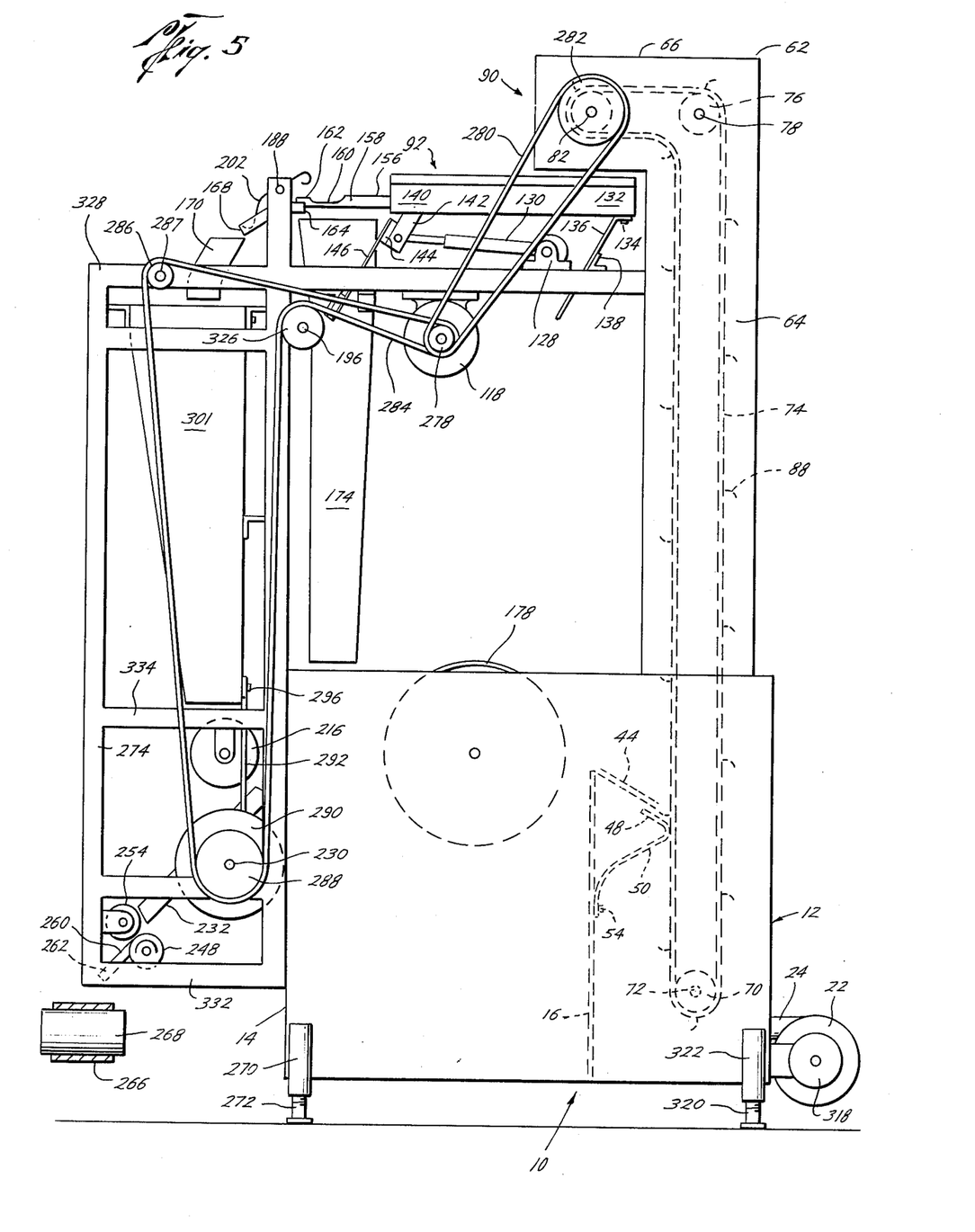
FIG. 5 is a schematic view of the other side of the apparatus shown in FIG. 1, which illustrates details of the chain drive taught by the preferred embodiment of the present invention.

FIG. 5 shows the side of the preferred embodiment opposite the side shown in FIG. 1. In FIG. 5 like numbers indicate like structures. Because the preferred embodiment of the present invention has three identical shrimp deheading modules, analogous structures on the far right hand module of the shrimp orienting and deheading sections shown in FIG. 2 are labeled with the numbers originally used in the discussion of their counterparts on the left-hand shrimp orienting and deheading module.

In FIG. 5, a second prime mover 318 is shown driving centrifugal pump 22 to recirculate water from the posterior portion of tank 10 to the anterior shrimp containing portion of the tank. Adustable screw foot 320 threadably engages rear right-hand leg 322 mounted at the back base of wall 12 of tank 10. Prime mover 118 is shown driving dual ratchet 278. The outer portion of dual ratchet 278 drives chain drive 280, which engages drive ratchet 282 to drive conveyor belt 74. The inner portion of dual drive ratchet 278 engages chain drive 284. Chain drive 284 passes over drive pulley 326 on axle shaft 196. Chain 284 then passes down around drive ratchet 288 on shaft 230 and back up over idler pulley 286 on axle 287. Axle 287 is affixed to horizontal support member 328, which parallels horizontal support member 110 in FIG. 1. Horizontal support member 328 is affixed at its forward edge to vertical support member 274. A second vertical support member 330 lies proximate front 14 of tank 10 and is parallel and coordinate with vertical support member 104 shown in FIG. 1. Likewise, horizontal support member 332 is parallel to and structurally coordinate with horizontal support member 98 of FIG. 1 and horizontal support member 334 is parallel to and coordinate with horizontal support member 106 of FIG. 1.

Functionally, FIG. 5 illustrates the drive mechanism for shaft 196, which drives timing arm 194, and shaft 230 on ratchet 288, which drives cam disc 290 as well as slotted orienting wheel 216 and deheader rollers 248 and 254 by means of chain drives described in connection with FIG. 1, above. FIG. 5 also illustrates details of the chain drive between ratchet 278 and drive ratchet 282 on shaft 82, which drives elevator conveyor belt 74.

Figures 6, 7:
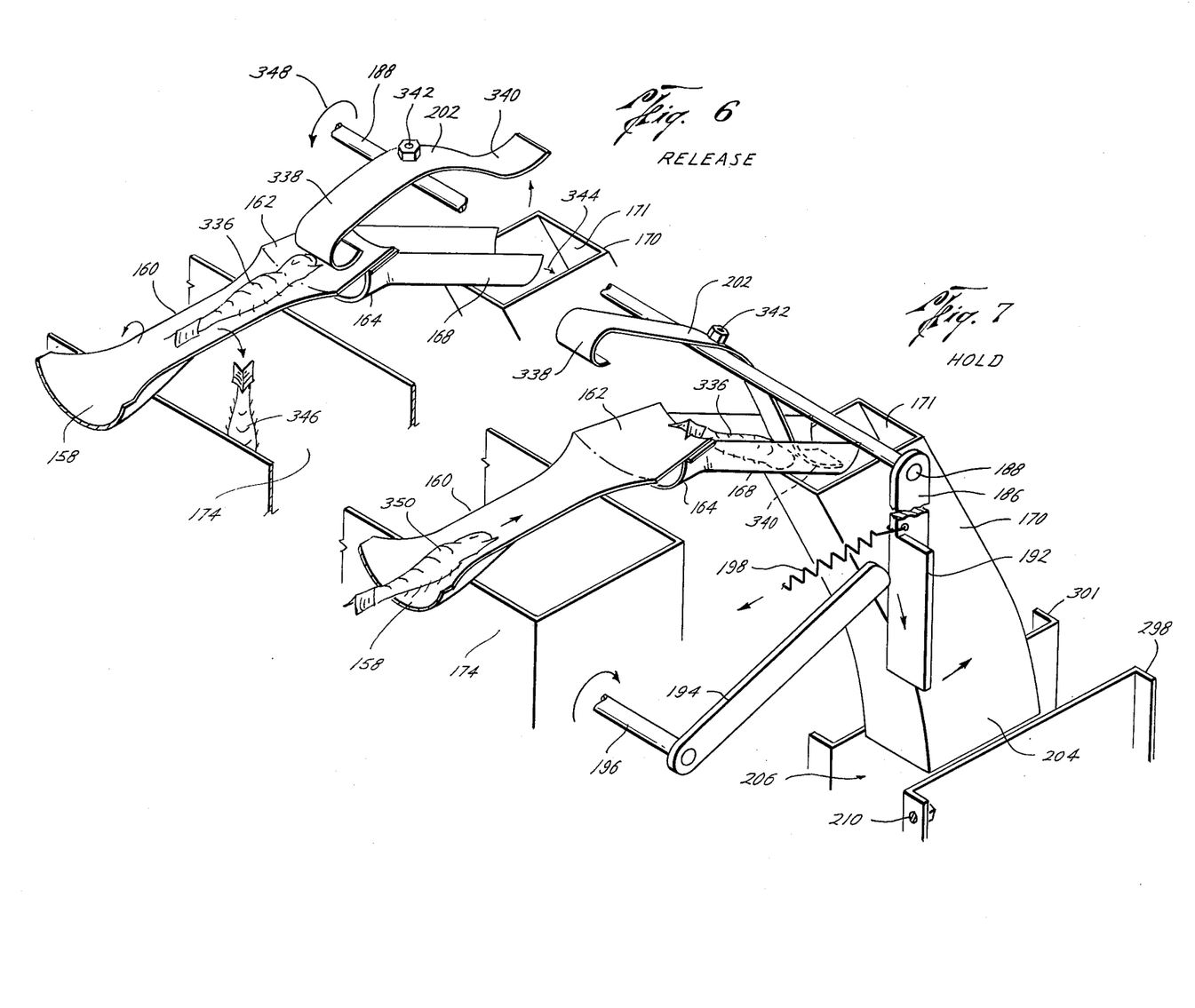
FIG. 6 shows a detailed isometric view of the shrimp hold and release mechanism, in its "release" mode, taught by the preferred embodiment of the present invention.
FIG. 7 shows an isomeric view similar to FIG. 6 with the hold and release mechanism illustrated in its "hold" mode.

FIG. 6 shows an isometric operational view of the shrimp hold and release mechanism located at the top of the present invention above each of the variable geometry shrimp orienting chutes. In FIG. 6 like numbers illustrate like structures.

Structurally, forward end 158 of v-shaped shrimp transfer member is shown with shrimp 336 lying on low-walled portion 160 of the v-shaped member. Forward portion 162 ahead of low-walled portion 160 operationally engages rear section 164 of transfer trough 168. A curved strip of metal 202 having a shrimp stopping end 338 and a shrimp passing end 340 is affixed by bolt 342 to synchronizing shaft 188. The nose of shrimp 336 is butting up against shrimp stopping end 338 of curved metal strip 202. The shrimp that was lying in section 168 of the transfer trough has departed in the direction shown by arrow 334 into the upper end 171 of connecting chute 170. A second shrimp 346 that had piled up on top of waiting shrimp 336 is shown as it falls off low-walled portion 160 of v-shaped member 158. Surplus shrimp 346 is falling through shrimp return chute 174 back into the front of tank 10.

Functionally, FIG. 6 shows the shrimp selecting mechanism as it releases one shrimp into transfer chute 170. The shrimp selecting and release mechanism holds this position only for the short period of time during which synchronizing lever 194 is engaging arm 186 and causing control shaft 188 to rotate in the direction shown by arrow 348. Any additional shrimp that queue up behind waiting shrimp 336 will fall off the low-walled section 160 of v-shaped member 158 as is shown by excess shrimp 346. Such shrimp fall through return chute 174 back into tank 10.

The purpose of this mechanism is to deliver one shrimp at a time to the upper end of orienting chute 206 in synchronization with the chute's opening and closing. When operating handle 186 is displaced, a shrimp is released into the variable geometry chute.

FIG. 7 shows a release mechanism described in FIG. 6 during the portion of its operating cycle when it is holding a shrimp for release into variable geometry chute 206. Again like numbers indicate like structures.

In FIG. 7 synchronizing arm 194 has rotated past control arm 186. Control arm 186 is biased back to its normal position by tension imparted by spring 198. Shrimp releasing end 340 of strip 202 moved downward and come into contact with forward end 168 of the shrimp transfer trough. Shrimp 336 has moved forward and is now held in position by end 340 of metal strip 202. A further shrimp 350 is moving down v-shaped member 158 to low-walled section 160. When synchronizing arm 194 rotates back to the position where it strikes operating arm 186, then shrimp 350 will be held by shrimp holding end 338 of metal strip 202. Shrimp releasing end 340 will move upward and shrimp 336 will fall through tranfer chute 170 into the upper end of variable geometry chute 206.

Figures 8, 9:
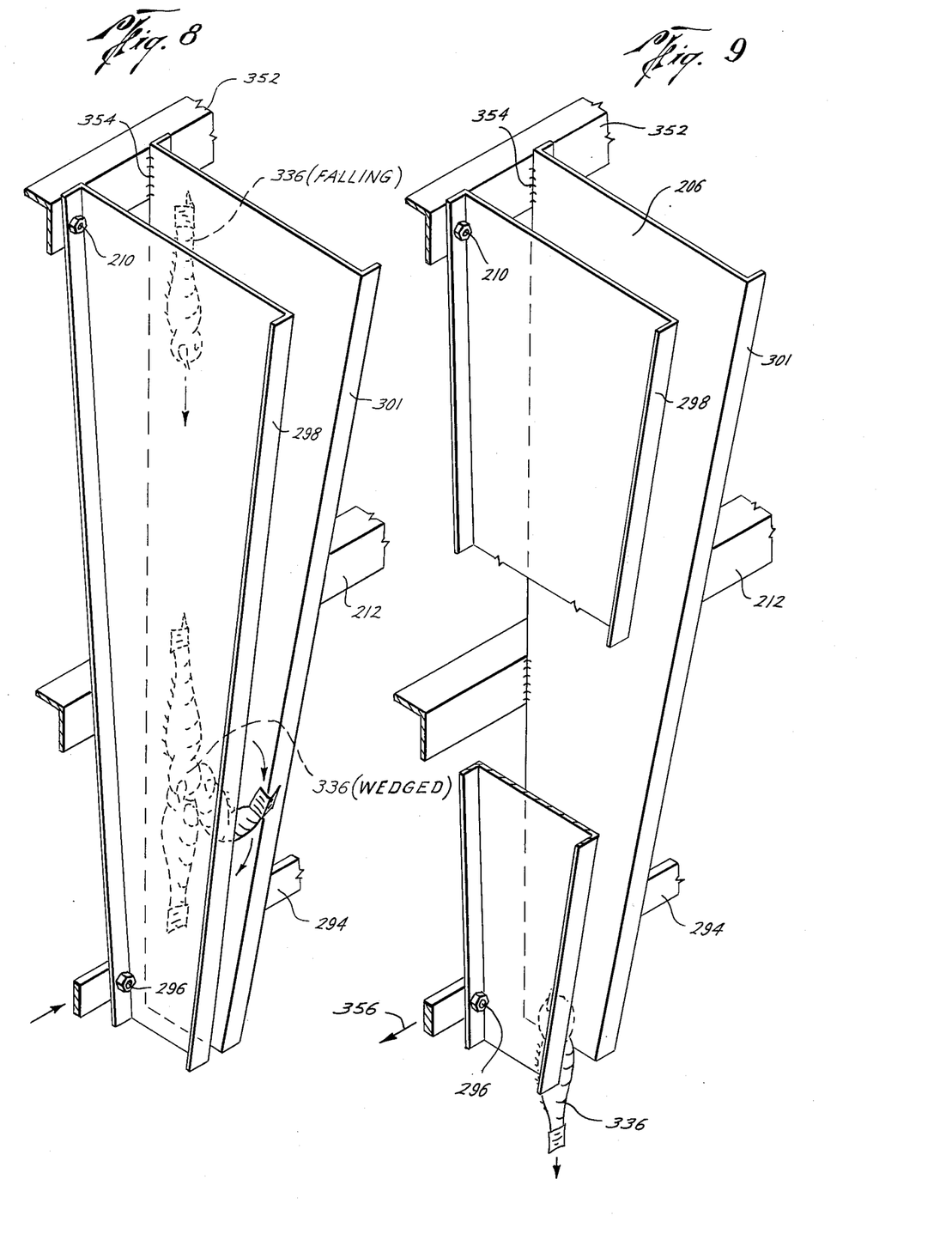
FIG. 8 is an isometric view of the shrimp orienting means taught by the preferred embodiment of the present invention. The shrimp orienting means in FIG. 8 is shown in its "closed" position and a shrimp is shown both entering head-first and flipping to a tail-first orientation.
FIG. 9 is a partially cut away detailed view of the shrimp orienting means shown in FIG. 8. The shrimp orienting means in FIG. 9 is shown in its "open" position with a shrimp dropping tail-first out of it.

FIGS. 8 and 9 illustrate the detail of the variable geometry shrimp orienting chute utilized by the preferred embodiment of the present invention. Again like figures indicate like parts.

Structurally, fixed wall 301 of the variable geometry shrimp orienting chute is attached to upper structural member 352 by welding at point 354.

Functionally, shrimp 336, which was discussed in connection with FIGS. 6 and 7, has fallen through transfer chute 170 and entered the variable geometry shrimp orienting chute. FIG. 8 shows shrimp 336 in two different positions. First, it shows shrimp 336 entering the chute head first. Second, it shows shrimp 336 wedged by its head into a lower portion of the chute and illustrates how the tail of the shrimp rotates in the chute, causing the shrimp to assume a tail down position.

The upper end of shrimp orienting chute 206 is large enough to permit the passage of any shrimp. When the chute is in its normal position, i.e., with the lower end of the chute much narrower than the upper end, then the shrimp's head will become wedged between the walls of the chute at some point. When this occurs, the weight of the shrimp's tail causes the shrimp to pivot about its head and assume the tail downward orientation shown in FIG. 8 at the point marked 336 (wedged). The shrimp holding and releasing means described in connection with FIGS. 6 and 7 above are synchronized so only a single shrimp is in the shrimp orienting chute at any one time.

When cam 290 (discussed in connection with FIG. 2 above) rotates to push synchronizing bar 292 to the left, then cross-bar 294 moves in the direction shown by arrow 356 in FIG. 9 and pivoted side 298 swings away from fixed side 301. As is shown in FIG. 9, this allows shrimp 336 to fall tail first out of the shrimp orienting chute. As was discussed above, movable side 298 of the shrimp orienting chute pivots at its upper end about pivot nut 210 and at its lower end about cross-bar pivot nut 296.

Once the shrimp leaves the shrimp orienting chute, as shrimp 336 is doing in FIG. 9, it enters the mechanism described in connection with FIGS. 10 and 11, below.

Figure 10:
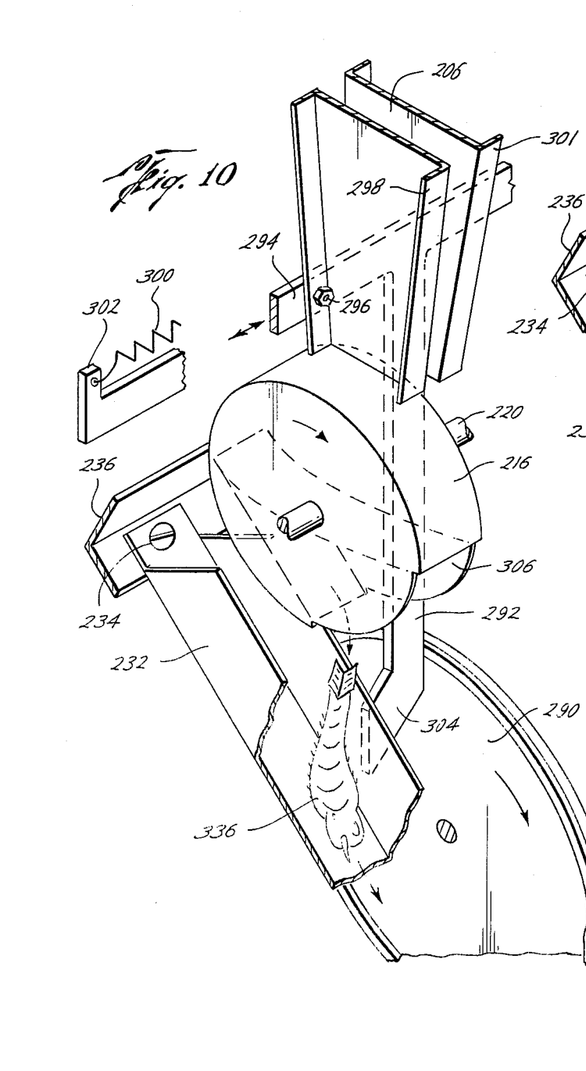
Figure 11:
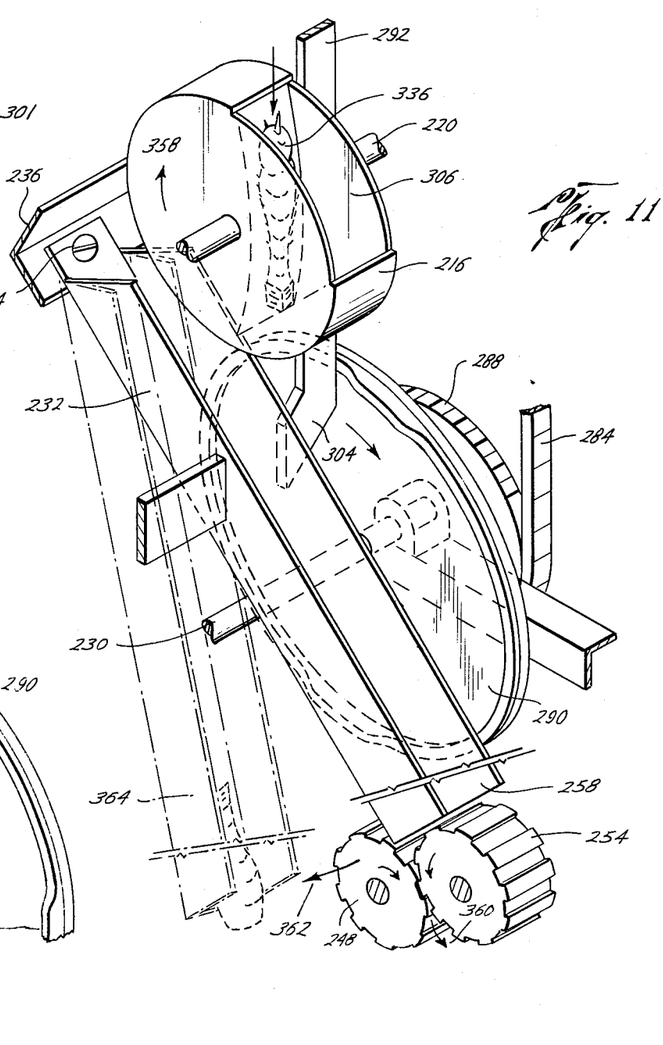

FIGS. 10 and 11 illustrate the apparatus used to present shrimp head first to the deheading wheels of the present invention and the mechanical means by which the tails are deposited on a conveyor belt once the head has been removed.

Structurally, FIGS. 10 and 11 depict the mechanism already described in the text associated with FIG. 2, above.

The only structural detail remaining is the shape of receiving slot 306 within rotating shrimp orienter 216. As can be seen in the drawing, the slot consists of an off axis pieshaped void.

Functionally, shrimp 336 falls out of the bottom of shrimp orienting chute 206 when receptacle 306 in wheel 216 is in the attitude depicted in FIG. 11. Shrimp 336 falls tail first into receptacle 306. The receptacle is rotating in the direction shown by arrow 358. As wheel 216 rotates, the shrimp 336 falls head first out of the receptacle, as is shown in FIG. 10, into shrimp deheader delivery trough 232.

Shrimp 336 slides down shrimp deheader delivery trough 232 to end 258. There the head is caught between rollers 254 and 248 shown in FIG. 11. Being more elastic than the meaty section of the tail, the head is pinched between the rollers and expelled by them in the direction shown by arrow 360. After the head has been removed, the meaty section of the tail is still resting within the end 258 of trough 232. As was described in connection with FIG. 2 above, cam 290 pushes against synchronizing arm 292. This causes cross arm 304 to pivotally displace end 258 of trough 232 about pivot point 234 in the direction of arrow 362. Trough 232 moves to the position shown by dotted line figure 364. At this point the meaty portion of the shrimp falls out of trough 232 onto transfer trough 260, which is not shown in FIG. 11. As was described in FIG. 2, the tail slides down trough 260 onto conveyor belt 266 and it is transported away for further processing.

As was mentioned above in the Summary of the Invention, the principle of the present invention may be implemented by a large number of mechanical constructions. These constructions will all have in common the use of the mass of the tail and the width of the shrimp's head to align the shrimp; and the use of the fact that the shrimp's head is more compressible and flexible than its meaty tail to provide a mechanical means to remove the head from the tail. The above detailed preferred embodiment is only illustrative. The present invention should only be limited by the appended claims and their equivalents.

We claim:

1. An apparatus for orienting and dissecting a crustacean comprising:
   orienting means comprising
   at least one passageway of infundibuliform cross-section, said passageway being sized to receive a crustacean at one end, the taper of said infundibuliform passageway being adapted to prevent passage of said first portion of said crustacean's anatomy;
   timing means operatively connected to said orienting means for controllable varying the taper of said infundibuliform passageway so the entire body of said crustacean can pass through said passageway after said first portion has been caught; and
   dissecting means comprising:
   transfer means responsive to said orienting means and said timing means for receiving and controlably manipulating the orientation of said crustacean from the end of said passageway; and
   gripping means adapted to receive said crustacean from said transfer means for selectively gripping said first portion of said crustacean and severing said first portion from said body.

2. An apparatus as in claim 1 wherein:
   said orienting means is a vertical chute having at least one moveable side pivotably fixed at its upper end, said chute being wide enough at said upper end to permit entry of a shrimp;
   said timing means is a motor driven mechanical linkage functionally attached to said moveable side of said chute, and adapted to periodically open the bottom end of said vertical chute to permit passage of a shrimp ;
   said transfer means is an inclined chute adapted to transfer a shrimp while maintaining said shrimp in a preferred orientation whose upper end is placed under the lower end of said vertical chute; and
   said gripping means is at least one roller disposed so as to receive a shrimp head first from said inclined chute, said roller being adapted to grip and pull said shrimp's head while being incapable of gripping and passing said shrimp's body, said pull being sufficient to sever said head from said body.

3. An apparatus for deheading shrimp comprising:
   a holding tank having a front and rear walls divided into a first portion having high water level adapted to contain a plurality of shrimp and a second portion having a lower water level, said first and second portions being separated by an intermediate high wall;
   a screen covered drum having a plurality of internal paddles rotatably mounted on an axis, said axis being positioned in said first portion of said tank parallel to said intermediate wall so as to partially submerge said drum;
   pumping means for removing water from said low water level portion of said tank adapted to pump said water through a plurality of orifices in said high water level portion of said tank to set up a circulation in said water and cause said drum to rotate on said axis, and further adapted to cause said water and shrimp to flow over said intermediate wall;
   a shrimp elevator in said low water portion of said tank, said elevator being equipped with a plurality of catch pockets for lifting shrimp and adapted to carry shrimp from said tank to a shaker table;
   an inclined mesh surface extending from the top of said intermediate wall downward toward said elevator adapted to allow shrimp to roll downward and be caught in said catch pockets;
   an inclined shaker table having at least one convergent longitudinal channel, said channel adapted to receive shrimp at its upper end from said catch pockets, said table being impelled to oscillatory motion by a prime mover;
   an inclined transfer trough, whose upper end engages the lower end of said shaker table, adapted to pass shrimp to a timing means;
   a timing means comprising a curved metal strip operatively mounted on an axis and adapted to selectively release one shrimp at a time from said transfer trough into the upper end of an orienting chute;
   control means for synchronizing the movement of said shrimp through the apparatus;
   a vertical orienting chute, whose upper end is proximate said timing means, comprising a fixed wall and a moveable wall pivotally mounted at its upper end, said chute being adapted to catch shrimp by the head when said chute is closed so the shrimp will be oriented tail down in the chute, said moveable wall further being responsive to said control means to selectably open said chute to allow said shrimp to fall tail first out of said chute;
   a shrimp inverter wheel beneath the lower end of said vertical chute having an opening adapted to receive said tail first shrimp from said chute, said wheel being rotatably mounted on an axle responsive to said control means and adapted to rotate and deposit said shrimp head first into a transfer chute;

a transfer chute whose upper end is proximate said inverter wheel and whose lower end is proximate the center of a pair of rollers, said chute being adapted to present said shrimp head first to the junction of said rollers; and a pair of counter rotating rollers proximate said lower end of said transfer chute adapted to grip and pass the head of said shrimp while not passing its body, said grip being sufficient to sever said head from said body.

4. An apparatus as in claim 3 wherein said rollers are made of rubber and are cogged rollers.

5. An apparatus as in claim 3 wherein said elevator is a conveyor belt and said catch pockets are lateral curved shelves at intervals to engage and carry shrimp.

6. An apparatus as in claim 3 wherein a portion of at least one side of the front end of said transfer trough is cut away to allow excess shrimp to fall out of the trough and said trough is positioned above the first portion of said shrimp containing tank.

7. An apparatus as in claim 3 wherein:
said transfer chute is pivotably mounted at its upper end and operationally responsive to said control means such that the chute moves said body away from said rollers after the head has been severed.

8. An apparatus as in claim 7 including a conveyor belt proximate the lower end of said transfer chute when said chute pivots adapted to receive said body.

* * * * *

UNITED STATES PATENT OFFICE
CERTIFICATE OF CORRECTION

Patent No. 4,054,970    Dated  October 25, 1977

Inventor(s) Shirley Jean Metzger, James Walker Smith, Juan Castillo Leal

It is certified that error appears in the above-identified patent and that said Letters Patent are hereby corrected as shown below:

Column 10, line 40: change "vibrater" to --vibrator--.

On the title page: in line 7 of the Abstract, change "gueueing" to --queueing--.

Column 2, line 50: change "isomeric" to --isometric--.

Column 10, line 30: after "out", change "into" to

Signed and Sealed this

Twenty-fifth Day of September 1979

[SEAL]

Attest:

LUTRELLE F. PARKER
Attesting Officer        Acting Commissioner of Patents and Trademarks